United States Patent [19]

Ammeraal et al.

[11] Patent Number: 4,840,679
[45] Date of Patent: Jun. 20, 1989

[54] PURIFICATION AND SEPARATION OF BRANCHED BETA-CYCLODEXTRINS

[75] Inventors: Robert N. Ammeraal, Worth, Ill.; Allan R. Hedges, Crown Point; David J. Gottneid, Griffith, both of Ind.

[73] Assignee: American Maize-Products Company, Stamford, Conn.

[21] Appl. No.: 71,097

[22] Filed: Jul. 8, 1987

[51] Int. Cl.$^4$ .................................................. C13K 1/08
[52] U.S. Cl. ........................................ 127/40; 127/48; 127/38; 536/103
[58] Field of Search .............................. 127/40, 38, 48; 536/103, 127, 128

[56] References Cited

U.S. PATENT DOCUMENTS

| | | | |
|---|---|---|---|
| 3,086,009 | 4/1963 | Zuschek et al. | 536/103 |
| 3,425,910 | 2/1969 | Armbruster et al. | 435/97 |
| 4,384,898 | 5/1983 | Okada et al. | 127/40 |
| 4,555,504 | 11/1985 | Jones | 536/103 |

FOREIGN PATENT DOCUMENTS

| | | | |
|---|---|---|---|
| 0193850 | 9/1986 | European Pat. Off. | 536/103 |
| 0173102 | 10/1983 | Japan | 536/103 |

OTHER PUBLICATIONS

Jun-ichi Abe et al., "Isolation and characterization of 6-α-D-glucosylcyclomathoheptaose", Carbohydrate Research, 131 (1984), pp. 175–179.
Yoshiyuki Sakano et al., "Preparation and Enzymatic Hydorlysis of Maltosyl-α-cyclodextrin", Agric. Biol. Chem., 49(12), 3391–98, 1985.
Shoichi Kobayashi et al., "Preparation of 6-O-α-D--Glucopyrano-Cyclohexyaamylose", Carohydrate Research, 126(1984)215-224.
Dexter French et al., "The Molecular Size and Structure of the δ-, ε-, ζ-, and η-Dextrins", Archives of Biochemistry and Biophysics, 111, pp. 153–160 (1965).
P. Taylor et al., "A new Substrate for the Detection of Amylo-, 1,6-Glucosiade, and its Application to the Study of Glycogen-, Storage Disease Type III", Arch. Biochem. Biophys. 113 (1966), 500–-502.
J. R. Starke, "An Improved Preparation of Substrates for the Estimation of Amylo 1,6 glucosidase Activity", Proceedings of the Biochemical Society, Biochem. J. 102 (1967), 27 p.
S. Kobayashi et al., "Preparation of α-, Branched and Hydroxyethyl Cyclodextrins in the Presence of Sodium Dodecyl Sulfate", Abstracts of the Articles Printed in Nippon Nogeikagaku Kaishi (in Japanese) (Vol. 51, No. 12) (1977), 691–698.

Primary Examiner—Helen M. S. Sneed
Assistant Examiner—Chung K. Pak
Attorney, Agent, or Firm—Lucas & Just

[57] ABSTRACT

A method for separating and purifying branched beta-cyclodextrins from aqueous solution. The process entails adding a beta-cyclodextrin complexant to a starting solution, recovering the precipitate so formed, dissolving the resulting precipitate in water, adding a second dose of beta-cyclodextrin complexant to the solution and recovering branched beta-cyclodextrin from the resulting liquor.

15 Claims, 4 Drawing Sheets

PURIFICATION AND SEPARATION OF BRANCHED BETA-CYCLODEXTRINS

This invention relates to a method for purifying and separating branched cyclodextrins from a solution containing the same and, more specifically, to purification and separation of branched beta-cyclodextrins.

Starch is a polymer of anhydroglucose that occurs in a variety of plants such as corn, potato, sorghum, rice, etc. No matter from what variety of plant the starch is extracted, starch occurs chemically in two forms: amylose, a straight chain; and amylopectin, a branched chain. Amylose is a straight chained polymer of anhydroglucose units bonded together by alpha 1,4 bonds while amylopectin is a polymer composed of a straight chain of alpha 1,4 anhydroglucose onto which side chains of alpha 1,4 anhydroglucose polymers are bonded. In amylopectin, the bond between the straight chain and the side chain is an alpha 1,6 bond. Starch generally contains both amylose and amylopectin molecules, the amount of each depending on the source of the starch. For example, high amylose corn starch contains about a 50:50 ratio while waxy maize corn starch contains about a 99:1 ratio of amylopectin:amylose. Generally, all starch contains some amylopectin.

Cyclodextrins, also called Schardingers dextrins, cycloamyloses, cyclomaltoses and cycloglucans are polymers of anhydroglucose polymers, bonded together by alpha 1,4 bonds to form a ringed compound. A six membered ring is called alpha-cyclodextrin, seven, beta-cyclodextrin and eight, gamma-cyclodextrin. These six, seven and eight membered rings are also referred to as cyclomaltohexaose, cyclomaltoheptaose and cyclomaltooctaose, respectively.

Branched cyclodextrins were described as early as 1965 by French and his co-workers, see French et al., Archives of Biochem. and Biophys. Volume III, pages 153–160, 1965, but have been studied very little recently. Branched beta-cyclodextrins, as their name implies, are non-branched beta-cyclodextrins onto which at least one unit of anhydroglucose is bonded such that a branch extends out from the ring structure. The branch is bonded to the ring by an alpha 1,6 bond, the same bond that amylopectin uses to join side chains onto its straight chain. For the purposes of definition, the term "beta-cyclodextrins" without the modifying word "branched" or "non-branched" means both branched beta-cyclodextrins and non-branched beta-cyclodextrins. For branched and non-branched beta-cyclodextrins, they will be referred to as such.

Cyclodextrins have a wide variety of uses because of their ability to act as a host for a number of compounds, and have found uses in the agricultural and pharmaceutical fields as well as other fields.

Branched beta-cyclodextrins are relatively soluble in water compared to non-branched beta-cyclodextrins. Specifically, non-branched beta-cyclodextrins have a solubility of about 2% by weight, while branched beta-cyclodextrins have a solubility of about 50% by weight and above. By using a branched beta-cyclodextrin as a host molecule for an insoluble compound, the insoluble compound can be dissolved in water.

Another important aspect of branched beta-cyclodextrins is that the branch itself provides a site for derivatization of the beta-cyclodextrin for other special applications. The addition onto the branch does not, generally, interfere with the ring structure of the beta-cyclodextrin and allows the ring structure of the branched beta-cyclodextrin to function as a host molecule. Generally, the branch itself does not interfere with the ring's function as a host molecule.

A solution containing beta-cyclodextrins is produced by treating starch slurry with an enzyme, cyclodextrin glycosyltransferase (CGT) at the appropriate pH, temperature and time for the selected CGT. The starch may be from any selected plant variety. The enzyme CGT is obtained from microorganisms such as *Bacillus macerans, B. megaterium, B. circulans, B. stearothermohiilus* and *Bacillus sp.* (alkalophilic) as well as others. The parameters for the reaction between the selected CGT enzyme and the selected starch are conventional and well described in the literature. Conventionally, the starch is slurried in aqueous solution at a concentration up to about 35% by weight solid. The slurry is then subjected to gelatinization and liquefaction by enzyme or acid to about 1 to about 5 DE. The preferred enzyme for liquefaction is bacterial alpha amylase. Next, the selected CGT is added to the gelatinized and liquefied slurry and the pH, temperature and time of the treatment are adjusted depending on the selected enzyme. Generally, the pH is between about 4.5 to about 8.5, the temperature ranges between ambient to about 75° C. and the length of the reaction runs for about ten hours to seven days. The amount of beta-cyclodextrins will vary depending on the treatment conditions and enzyme selected. The non-branched beta-cyclodextrins are then removed from the solution by crystalization or filtration in a conventional manner.

Currently it is thought that branched beta-cyclodextrins are formed by the action of CGT on amylopectin in a conventional manner. In order to produce predominately beta-cyclodextrin, the reaction between CGT and the gelatinized and liquefied starch slurry is conducted under a solvent such as toluene or p-xylene. Such solvents substantially increase the yield of beta-cyclodextrin.

Normally, when starch is treated with CGT, branched beta-cyclodextrins, non-branched beta-cyclodextrins and acyclic dextrins are formed. Separation and purification of branched beta-cyclodextrins from solution is extremely difficult, and methods employed heretofore have been extremely complicated and unable to separate branched beta-cyclodextrins from non-branched beta-cyclodextrins and acyclic dextrins on a large scale. The only known method for the separation and purification of branched beta-cyclodextrins from non-branched beta-cyclodextrins and acyclic dextrins were special chromatographic methods which, needless to say, are impractical for a true commercial operation.

A practical method for separating and purifying branched beta-cyclodextrins from non-branched beta-cyclodextrins and acyclic dextrins has now been discovered.

Broadly, the purification and separation process of the present invention comprises: forming a first precipitate and a first liquor from an aqueous starting solution containing branched beta-cyclodextrin, a first solution, by the addition of a beta-cyclodextrin complexant to the aqueous starting solution; recovering the first precipitate from said first solution; forming a second aqueous solution with the first precipitate; forming a second precipitate and a second liquor from said second solution by the addition of a beta-cyclodextrin complexant to said second solution; recovering the second liquor;

and, finally, recovering branched beta-cyclodextrins from said second liquor.

Beta-cyclodextrin complexants are well-known chemicals.

Preferably, the first precipitate is washed prior to the formation of the second solution. Such a wash step encompasses using a small amount of water to wash the precipitate and remove at least a portion of the acyclic dextrins from the first precipitate.

Also, preferably, in order to increase the purity of the branched beta-cyclodextrins, instead of recovering branched beta-cyclodextrins from the second liquor, a third solution is formed from the second liquor and a beta-cyclodextrin complexant is added to the third solution to form a third precipitate and a third liquor; the third liquor is recovered and, finally, branched beta-cyclodextrins are recovered from this third liquor.

An aqueous starting solution or first solution used in the present invention is an aqueous solution containing branched and non-branched beta-cyclodextrins such that about 1% or more of the total solids content of the solution is branched beta-cyclodextrins and such that the non-branched beta-cyclodextrins are in an amount in excess of the branched beta-cyclodextrins. The aqueous starting solution or first solution can be formed in a conventional manner by the treatment of a starch slurry with a CGT enzyme at the appropriate pH, temperature and length of time for the specific CGT enzyme. More preferred, the starting or first solution is obtained from a starch slurry that has been treated with a CGT enzyme at the appropriate pH, temperature and length of time for the specific CGT enzyme, and subsequently treated to remove non-branched beta-cyclodextrin in a crystalization or filtration operation in a conventional manner.

In fact, it has been found that using the mother liquor remaining after the commercial production of beta-cyclodextrin by the action of CGT on a starch slurry produces a very good starting or first solution for the method of the present invention.

Preferably, the starch used in forming the first or starting solution of the present invention is waxy starch and, more preferred, is waxy maize.

In order to obtain predominately branched beta-cyclodextrin, the treatment of a starch slurry with CGT is carried out under a solvent such as toluene or p-xylene in a conventional manner.

Typically, a preferred starting or first solution in accordance with the present invention contains about 1% to about 2% by weight branched beta-cyclodextrin and about 5% to about 20% by weight non-branched beta-cyclodextrin.

To this aqueous starting solution, a beta-cyclodextrin complexant is added to form a first precipitate and a first liquor. The beta-cyclodextrin complexant combines with beta-cyclodextrin to form a complex that precipitates out of the solution. This complex that precipitates is referred to as the first precipitate.

The addition of the beta-cyclodextrin complexant is accomplished in a conventional manner using conventional equipment. Typically, the beta-cyclodextrin complexant is added to the solution while the solution is being stirred. The temperature of the starting solution is preferably maintained between about 10° to about 25° C. and, more preferably, between about 15° to about 20° C.

The first or starting solution with the added beta-cyclodextrin complexant is allowed to stand for a period of about 1 to about 17 days in order for the precipitate to form. It will be appreciated by those of skill in the art that the precipitation does not form instantaneously but occurs over a period of time. It has been found that, after a period of about 3 days, all or the majority of the first precipitate has formed. Most preferred is that the time period for forming the precipitate be about 3 days or more.

The concentration of the aqueous starting solution is preferably about 24% to about 40% by weight solids and, more preferably, about 30% by weight solids.

The amount of beta-cyclodextrin complexant added in the first addition of beta-cyclodextrin complexant is at least about 10 parts by weight based on 100 parts by weight of beta-cyclodextrin in solution and, preferably, about 20 parts by weight based on 100 parts of beta-cyclodextrin in solution. The first precipitate contains both branched and non-branched beta-cyclodextrins.

Beta-cyclodextrin complexants are well known to those of skill in the art. Preferably, p-xylene or toluene are used, most preferred, p-xylene is used for the addition to the first or starting solution.

Recovery of this first precipitate is accomplished in a conventional manner using conventional equipment. Filtration or centrifugation can be used; filtration being preferred. Such a step produces the first liquor as a by-product.

The formation of the second solution is accomplished by mixing water with the first precipitate in a conventional manner using conventional equipment. Preferably, the precipitate is redissolved in water by heating and stirring the precipitate to form a solution of about 1.0% to about 20% by weight solids, more preferably, about 10% by weight. It has been found that the amount of heat needed to fully dissolve the first precipitate is such that the second solution boils, and a portion of the beta-cyclodextrin complexant contained within the first precipitate is evaporated.

Preferably, prior to redissolving the precipitate, the precipitate is washed in a conventional manner to remove a portion of acyclic dextrins. Washing of the first precipitate is accomplished by using one or two milliliters of water per gram of precipitate. The washing is repeated between two to three times.

Formation of the second precipitate and liquor is accomplished by the addition of a beta-cyclodextrin complexant to the second solution. The addition of the beta-cyclodextrin complexant to the second solution is accomplished in the same manner as the addition of beta-cyclodextrin complexant to the first or starting solution. At least about 10 parts by weight and, more preferably, about 20 parts by weight of beta-cyclodextrin complexant based on 100 parts by weight beta-cyclodextrin in the solution is added. The preferred temperature of the second solution, during the formation of the second precipitate, is between about 10° C. to about 25° C. and, more preferably, about 15° C. to about 20° C. Preferably, the time period for forming the second precipitate is about 3 days or more. Toluene is the preferred beta-cyclodextrin complexant used in forming the second precipitate and liquor.

The recovery of the second liquor from the second addition of beta-cyclodextrin complexant is accomplished in a conventional manner using conventional equipment such as by centrifugation or filtration. Preferably, the second precipitate is filtered out to leave only the filtrate. This filtrate or liquor contains branched beta-cyclodextrin and any non-branched beta-cyclodextrin that did not complex and form the second precipitate.

Branched beta-cyclodextrins are recovered from the second liquor by concentrating and drying the second liquor to remove the branched beta-cyclodextrins. The concentrating and drying of the second liquor to obtain branched beta-cyclodextrins is accomplished in a conventional manner using conventional equipment.

If a higher purity of branched beta-cyclodextrins is preferred, then, prior to recovering branched beta-cyclodextrins, a third solution is formed to which a beta-cyclodextrin complexant is added to form a third precipitate and a third liquor. The third liquor is then recovered, and branched beta-cyclodextrins are recovered from the third liquor.

The third solution is formed from the second liquor at a solution between about 1.0% to about 20% by weight solids and, more preferably, about 10% by weight. Generally, the second liquor must be concentrated in order to obtain the preferred about 10% by weight solids solution.

The addition of the beta-cyclodextrin complexant to the third solution to form the third precipitate and third liquor is accomplished in the same manner that the addition of beta-cyclodextrin complexant is added to the first or starting solution and the second solution. At least about 10 parts by weight and, more preferably, about 20 parts by weight of beta-cyclodextrin complexant is added to the third solution, based on 100 parts by weight beta-cyclodextrin in solution. The preferred temperature of the third solution during the formation of the third precipitate and liquor is between about 10° C. to about 25° C. and, more preferably, about 15° C. to about 20° C. Preferably, the time period for forming the third precipitate is about 3 days or more. Toluene is the preferred beta-cyclodextrin complexant used in forming the third precipitate and liquor. The actual addition of the beta-cyclodextrin complexant to the third solution is accomplished in a conventional manner using conventional equipment.

The recovering of the third liquor from the third solution is accomplished in a conventional manner using conventional equipment such as by centrifugation or filtration.

Preferably, this is accomplished by concentrating and drying the aqueous solution down to dry solids. Such a dried product has been found to contain about 70% to about 80% branched beta-cyclodextrin.

An alternative step to the present invention is to carry out an extraction step. Such a step is carried out on the first precipitate prior to the second addition of beta-cyclodextrin complexant. The extraction step is carried out by adding the first precipitate to about 9 parts of water by weight, based on 1 part by weight of precipitate, and mixing the water and precipitate in a temperature range of about 20° C. to about 40° C. It is important that this extraction step be carried out without boiling. The liquor from this extraction step is then concentrated and dried. The concentrated and dried liquor yields branched beta-cyclodextrins. The solid or precipitate remaining after the extraction step is then used to form the second solution and is subjected to the second addition of beta-cyclodextrin complexant and the remainder of the process.

Yet another alternative is to repeat the first precipitation step prior to forming the second solution. To practice this alternative method, a solution termed the fourth solution for purpose of differentiating between the other solutions is formed by mixing the first precipitate with water. The solids concentration of this fourth solution is preferably between about to about 40% by weight solids and, more preferably, about 30% by weight solids. To this fourth solution, a beta-cyclodextrin complexant is added in an amount of about 10 parts or more, preferably about 20 parts by weight, based on 100 parts by beta-cyclodextrin complexant in solution. The preferred beta-cyclodextrin complexant used for this fourth addition is p-xylene. The addition is accomplished in a conventional manner using conventional equipment. The temperature of the starting solution is preferably maintained between about 10° C. to about 25° C., more preferred, 15° C. to 0° C. The time period for formation of the precipitate from this fourth solution is about 1 to about 17 days. More preferred is a period of about 3 to 7 days and most preferred is a period of about 3 days or more. For purposes of definition, the precipitate and the liquor from this fourth solution is referred to as the fourth precipitate and fourth liquor.

Figure 1:
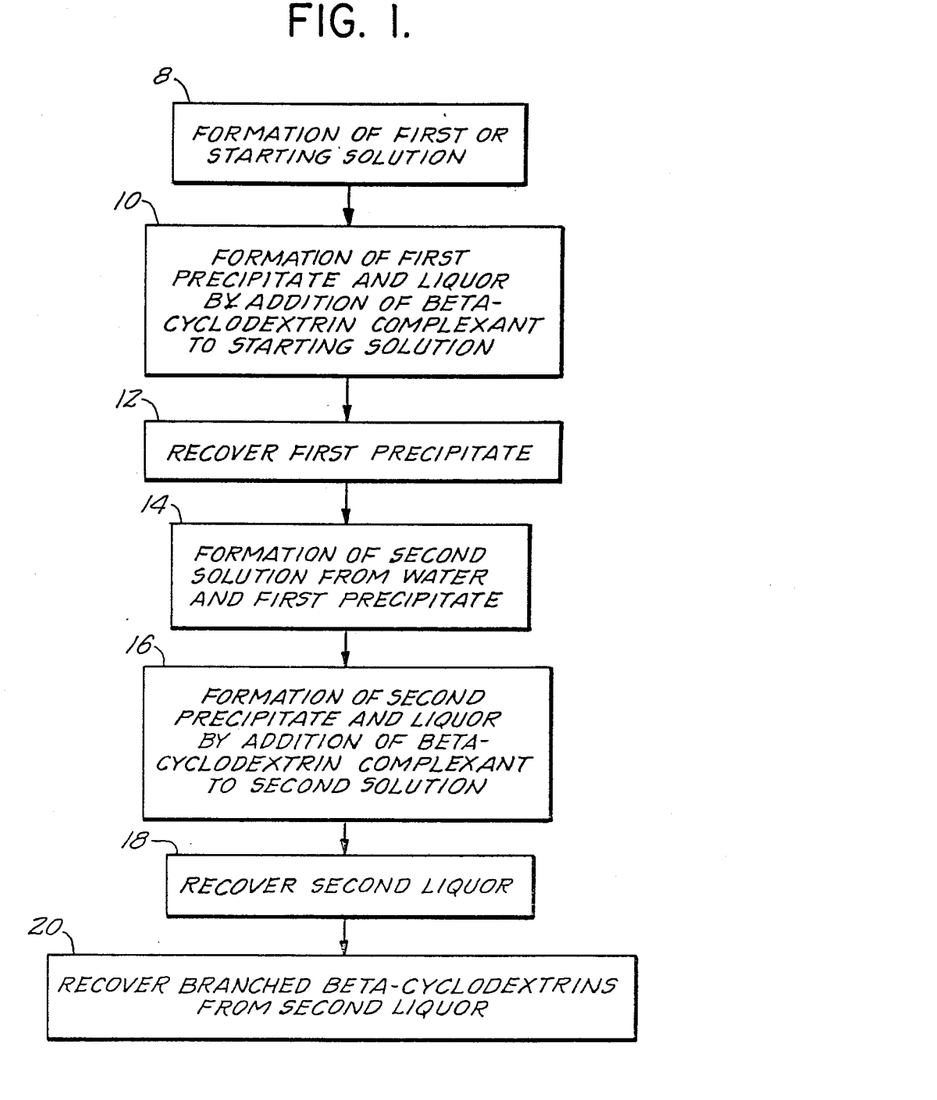
FIG. 1 illustrates a broad embodiment of the present invention with respect to branched beta-cyclodextrins.

FIG. 1 illustrates the process of the present invention wherein a starting solution is formed, 8, followed by the formation, 10, of a first precipitate and liquor by the addition of a beta-cyclodextrin complexant to the starting solution. The next step is to recover, 12, the first precipitate from the starting solution. Next, the second solution is formed, 14, from heating and mixing the first precipitate with water. A second precipitate and second liquor are formed, 16, from the second solution, by the addition of a beta-cyclodextrin complexant to the second solution. The second liquor from the second solution is recovered, 18, and, finally, branched beta-cyclodextrins are recovered from the second liquor.

Figure 2:
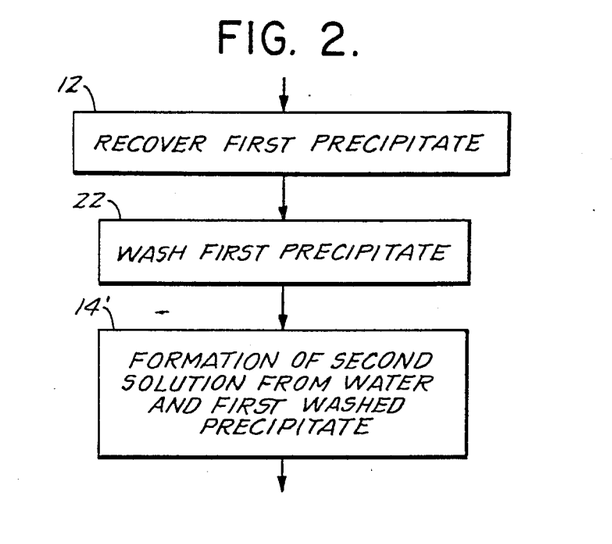
FIG. 2 illustrates a preferred wash step of the present invention.

FIG. 2 illustrates a preferred embodiment of the present invention wherein a washing step 22 is employed between recovery of the first precipitate and formation 14' of the second solution from the washed first precipitate, otherwise, steps 16 through 20 of FIG. 1 are carried out and, prior to step 12, steps 8 and 10 are carried out.

Figure 3:
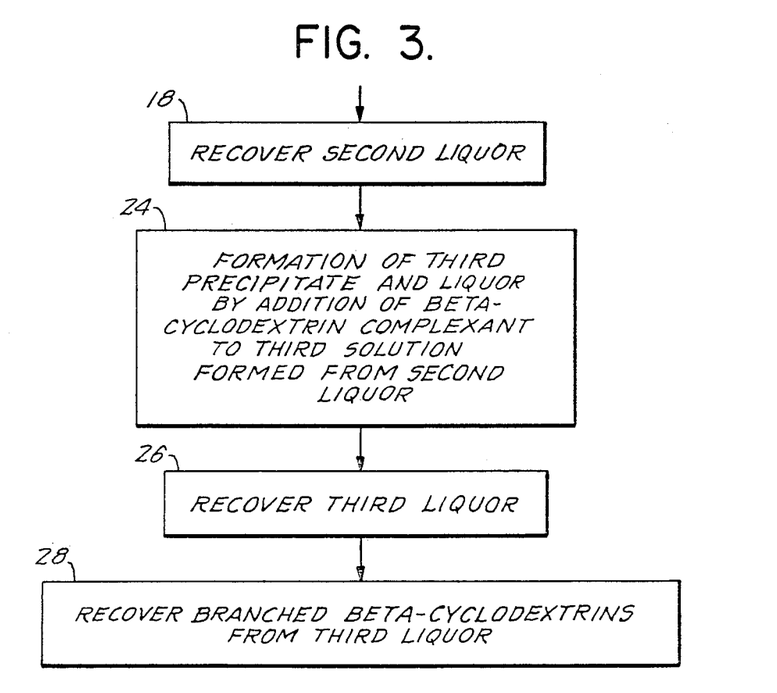
FIG. 3 illustrates the additional step of forming a third solution and third liquor in accordance with the present invention.

FIG. 3 illustrates yet another preferred embodiment of the present invention wherein a third liquor and third precipitate are formed, 24, from a third solution; the third solution being formed from the second liquor. A beta-cyclodextrin complexant is added to this third solution to form the third precipitate and third liquor. The third precipitate is recovered, 26, and branched beta-cyclodextrin is recovered, 28, from the third liquor.

Figure 4:
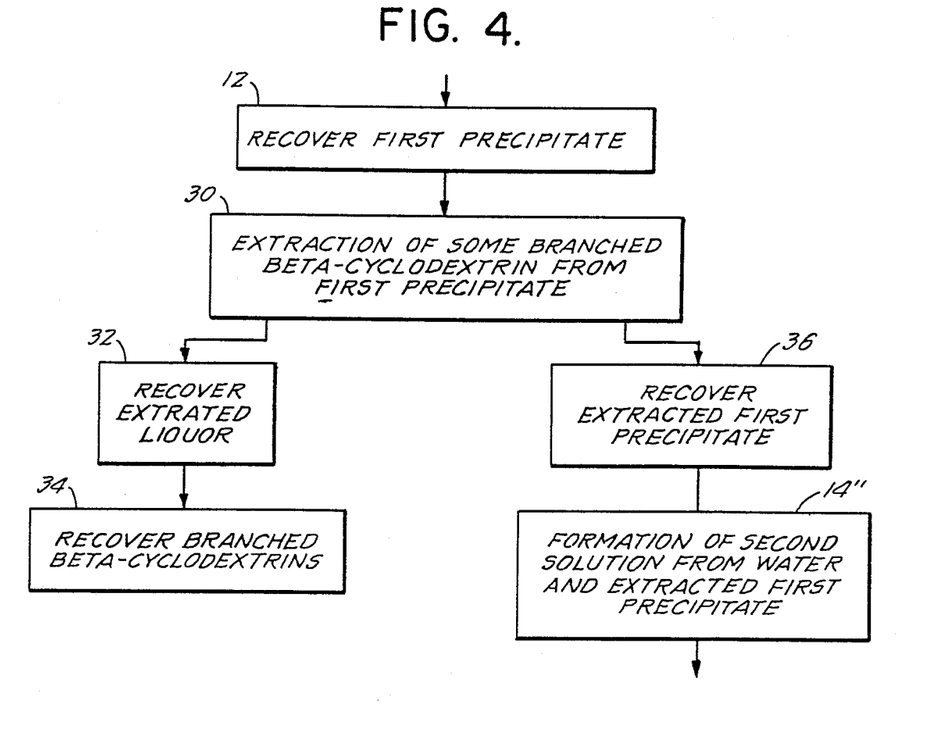
FIG. 4 is an alternative step in accordance with the present invention which can be used to obtain a highly pure branched beta-cyclodextrin.

FIG. 4 illustrates the extraction step. After recovering 12 the first precipitate from the starting or first solution, the first precipitate is subjected to an extraction step 30. From the extraction step, the extracted liquor is recovered, 32, and subjected to a concentration and drying process to recover, 34, branched beta-cyclodextrins. The recovered, 36, first precipitate, after the extraction step, is used to form the second solution 14". Steps 16 through 20 are subsequently performed after 14".

Figure 5:
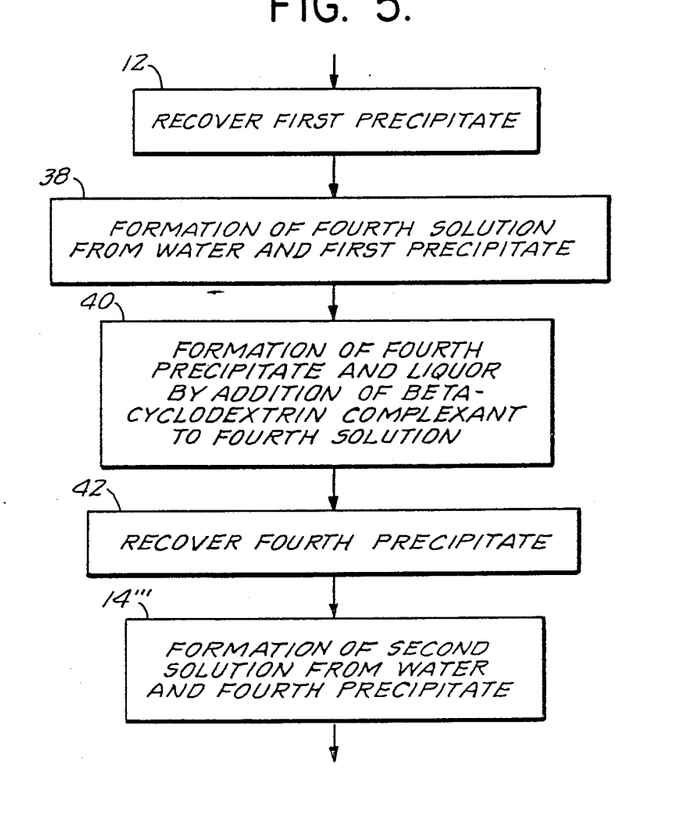
FIG. 5 is yet another alternative which can be employed in the present invention.

FIG. 5 illustrates repeating the first precipitation step, wherein a fourth solution is formed, 38, having a concentration of between about 24% to 40% by weight and, more preferably, about 30% by weight by mixing the first precipitate with water to form a solution. A fourth precipitate and liquor are formed, 40, by addition of a beta-cyclodextrin complexant, preferably p-xylene, to the fourth solution. After a fourth precipitate forms, it is recovered, 42. This fourth precipitate is then used to form the second solution 14''' in FIG. 5 following the procedures discussed above.

EXAMPLE I

To an aqueous starting solution containing 463 grams of carbohydrate, at 30% solids, 45 ml of p-xylene was added and stirred for about 20 hours and then allowed to stand for 14 days, thereby forming the first precipitate. The solution was then filtered on an 18.5 cm paper pad in a Buchner funnel under vacuum. The filter cake was washed three times with about 100 ml of distilled water for each wash. The filtrate and washings were discarded and the filter cake was allowed to air dry. About 94 grams of air-dried cyclodextrin/p-xylene complex was obtained. The analysis conducted on this material is shown in TABLE I below. This analysis can be done on an HPLC column in a conventional manner.

TABLE I

| Component | Percent by weight solids | Total Grams |
|---|---|---|
| Acyclic Components | .25 | .19 |
| Non-branched beta-Cyclodextrin | 89.5 | 67.30 |
| Branched beta-cyclodextrin | 10.25 | 7.70 |

The filter cake was then added to 11 parts of distilled water (846 ml) and stirred with a magnetic bar for about 17 hours, thereby conducting an extraction step on the first precipitate. The undissolved material was removed by filtration and the filter cake was washed with 100 ml portions of water 3 times. The filter cake was air dried and set aside. The filtrate and washings were combined and evaporated to 10% solids. About 21.1 grams of solids was present in solution and 1.21 grams of toluene was added with stirring to the 10% solids solution. Stirring was continued for three days at ambient temperature. A precipitate formed and the precipitate was removed by filtration and washed three times with 24 ml. portions of water. The precipitate contained about 63 grams of carbohydrate. Filtrate and washings were boiled to remove toluene, concentrated, and dried at 110° C. This was designated as Filtrate I, and the makeup of this filtrate is listed in TABLE II below.

The precipitate from the previous extraction step procedure (63 grams carbohydrate) was dissolved in 567 grams (9 parts) of distilled water with boiling to remove solvent, thereby forming the second solution. Next, 12.6 grams of toluene (20% of the carbohydrate solids) were added with stirring. After three days, the precipitate was removed by filtration and the resultant filtrate was held under toluene at 10% solids, third solution, for three days to remove additional non-branched beta-cyclodextrin. The precipitate was removed by filtration and the filtrate was boiled to remove toluene, concentrated and dried at 110° C. and designated Filtrate II. The makeup of Filtrate II is shown in TABLE II below.

TABLE II

| Component | Filtrate I % | Filtrate I Grms | Filtrate II % | Filtrate II Grms | Composite Product % | Composite Product Grms |
|---|---|---|---|---|---|---|
| Acyclic | 4.3 | .24 | 3.4 | .14 | 1.9 | .18 |
| Total branched beta-cyclodextrin | 76.3 | 4.24 | 79.3 | 3.23 | 78.9 | 7.36 |
| Total non-branched beta-cyclodextrin | 19.3 | 1.07 | 17.3 | .70 | 19.2 | 1.79 |
| Total Solids | 100.0 | 5.55 | 100.0 | 4.06 | 100.0 | 9.32 |

It will be understood that the preferred embodiments of the present invention herein chosen for the purpose of illustration are intended to cover all changes and modifications of the preferred embodiments of the present invention which do not constitute a departure from the spirit and scope of the present invention.

What is claimed is:

1. A method for purifying and separating branched beta-cyclodextrins comprising the steps of:
    (a) forming a first precipitate and a first liquor by adding a beta-cyclodextrin complexant to a first solution, said first solution having a solids concentration of about 24 to about 40% by weight;
    (b) recovering said first precipitate;
    (c) washing said first precipitate with water to remove a portion of acyclic dextrins from said first precipitate;
    (d) forming a second solution by mixing water with the washed first precipitate;
    (e) forming a second precipitate and a second liquor by adding a beta-cyclodextrin complexant to the second solution;
    (f) recovering said second liquor; and
    (g) recovering a purified branched beta-cyclodextrin from said second liquor.

2. The method of claim 1 wherein the beta-cyclodextrin complexant is selected from the group consisting of p-xylene and toluene.

3. The method of claim 1 wherein step (a) is conducted at a temperature between about 10° C. to about 25° C. for a period of about three days or more.

4. The method of claim 1 wherein steps (a) and (e) are both conducted at a temperature between about 10° C. to about 25° C. for a period of about three days or more.

5. The method of claim 1 wherein the amount of betacyclodextrin complexant added in both steps (a) and (e) is about 20 parts by weight based on 100 parts by weight beta-cyclodextrin present in solution.

6. The method of claim 1 wherein the recovery step in both steps (b) and (f) is conducted by filtration.

7. The method of claim 1 wherein the recovery step (g) is carried out by condensing and drying said second liquor to form a dry product.

8. A method for purifying and separating branched beta-cyclodextrins comprising the steps of:
    (a) forming a first precipitate and a first liquor by adding a beta-cyclodextrin complexant to a first solution, said first solution having a solids concentration of about 24 to about 40% by weight;
    (b) recovering said first precipitate;

(c) washing said first precipitate with water to remove a portion of acyclic dextrins from said first precipitate;
(d) forming a second solution by mixing water with the washed first precipitate;
(e) forming a second precipitate and a second liquor by adding a beta-cyclodextrin complexant to the second solution;
(f) recovering said second liquor; and
(g) forming a third solution from said second liquor;
(h) forming a third precipitate and a third liquor by adding a beta-cyclodextrin complexant to the third liquor;
(i) recovering said third liquor; and
(j) recovering a purified branched beta-cyclodextrin from said third liquor.

9. The method of claim 8 wherein the beta-cyclodextrin complexant is selected from the group consisting of p-xylene and toluene.

10. The method of claim 8 wherein the addition of a beta-cyclodextrin complexant in steps (a), (e) and (h) is conducted at a temperature between about 10° C. to about 25° C. for a period of about three days.

11. The method of claim 8 wherein the amount of said beta-cyclodextrin added in steps (a), (e) and (i) is about 20 parts by weight based on 100 parts by weight beta-cyclodextrin present in solution.

12. The method of claim 8 wherein the recovery step in each of steps (b), (f) and (i) is conducted by filtration.

13. The method of claim 8 wherein the recovery step (j) is carried out by condensing and drying said third liquor to obtain a dry product.

14. A method for purifying and separating branched beta-cyclodextrins comprising the steps of:
(a) forming a first precipitate and a first liquor by adding a beta-cyclodextrin complexant to a first solution, said first beta-cyclodextrin complexant selected from the group consisting of p-xylene and toluene;
(b) recovering said first precipitate;
(c) washing said first precipitate with water to remove a portion of acyclic dextrins from said first precipitate;
(d) forming a second solution by mixing water with the washed first precipitate;
(e) forming a second precipitate and a second liquor by adding a second beta-cyclodextrin complexant to the second solution, said second beta-cyclodextrin complexant selected from the group consisting of p-xylene and toluene;
(f) recovering said second liquor; and
(g) recovering branched beta-cyclodextrin from said second liquor.

15. A method for purifying and separating branched beta-cyclodextrins comprising the steps of:
(a) forming a first precipitate and a first liquor by adding a beta-cyclodextrin complexant to a first solution, said first beta-cyclodextrin complexant selected from the group consisting of p-xylene and toluene;
(b) recovering said first precipitate;
(c) washing said first precipitate with water to remove a portion of acyclic dextrins from said first precipitate;
(d) forming a second solution by mixing water with the washed first precipitate;
(e) forming a second precipitate and a second liquor by adding a beta-cyclodextrin complexant to the second solution, said second beta-cyclodextrin complexant selected from the group consisting of p-xylene and toluene;
(f) recovering said second liquor; and
(g) forming a third solution from said second liquor;
(h) forming a third precipitate and a third liquor by adding a beta-cyclodextrin complexants to the third liquor;
(i) recovering said third liquor; and
(j) recovering branched beta-cyclodextrin from said third liquor.

* * * * *

UNITED STATES PATENT AND TRADEMARK OFFICE
CERTIFICATE OF CORRECTION

PATENT NO. : 4,840,679

DATED : June 20, 1989

INVENTOR(S) : Robert N. Ammeraal et al.

It is certified that error appears in the above-identified patent and that said Letters Patent is hereby corrected as shown below:

Column 2, lines 34 and 35, change "predominantely" to --predominately--.

Column 3, line 58, change "predominantely" to --predominately--.

Column 6, line 17, after "about" insert --24%--; line 28, change "0°C" to --20°C--.

Column 9, line 21, change "(h)" to --(i)--; line 36, before "beta-cyclodextrin", insert --first--.

Column 10, line 35, change "complexants" to --complexant--.

Signed and Sealed this

Twenty-seventh Day of February, 1990

Attest:

JEFFREY M. SAMUELS

*Attesting Officer*   *Acting Commissioner of Patents and Trademarks*